United States Patent
Bond et al.

(10) Patent No.: US 10,364,022 B2
(45) Date of Patent: Jul. 30, 2019

(54) AIRCRAFT LANDING GEAR ASSEMBLY

(71) Applicants: SAFRAN LANDING SYSTEMS UK LTD, Gloucester, Gloucestershire (GB); Safran Landing Systems, Velizy-Villacoublay (FR)

(72) Inventors: David Bond, Gloucester (GB); Melvin Ekbote, Velizy-Villacoublay (FR); Mayur Kallabettu, Velizy-Villacoublay (FR); Gerard Balducci, Velizy-Villacoublay (FR)

(73) Assignees: Safran Landing Systems UK LTD (GB); Safran Landing Systems (FR)

( * ) Notice: Subject to any disclaimer, the term of this patent is extended or adjusted under 35 U.S.C. 154(b) by 362 days.

(21) Appl. No.: 14/937,145

(22) Filed: Nov. 10, 2015

(65) Prior Publication Data

US 2016/0137295 A1    May 19, 2016

(30) Foreign Application Priority Data

Nov. 13, 2014   (EP) ..................................... 14193083

(51) Int. Cl.
*B64C 25/30*   (2006.01)
*B64C 25/26*   (2006.01)
*B64C 25/24*   (2006.01)

(52) U.S. Cl.
CPC .............. *B64C 25/30* (2013.01); *B64C 25/24* (2013.01); *B64C 25/26* (2013.01)

(58) Field of Classification Search
CPC .......... B64C 25/18; B64C 25/24; B64C 25/26
See application file for complete search history.

(56) References Cited

U.S. PATENT DOCUMENTS

| 2,348,493 | A | * | 5/1944 | MacDonald | B64C 25/50 244/104 FP |
| 3,556,440 | A | * | 1/1971 | Lallemant | B64C 25/14 244/104 R |
| 3,596,740 | A | * | 8/1971 | Nau | F16D 43/216 188/134 |
| 4,607,180 | A | | 8/1986 | Stoody | |
| 4,720,063 | A | * | 1/1988 | James | B64C 25/14 244/102 R |

(Continued)

FOREIGN PATENT DOCUMENTS

| CN | 102390526 | 3/2012 |
| DE | 102013104554 | 11/2013 |

(Continued)

OTHER PUBLICATIONS

Bennett et al., "Fault-tolerant electric drive for an aircraft nose wheel steering actuator", IET Electrical Systems in Transportation, vol. 1, Issue 3, Sep. 2011 (Abstract Only), 2 pages.

(Continued)

*Primary Examiner* — Michael H Wang
(74) *Attorney, Agent, or Firm* — RatnerPrestia (57) ABSTRACT

An aircraft landing gear assembly includes a lock link and a rotary electromechanical actuator which includes motor and gearbox unit arranged to move a pawl into contact with the lock link to break the lock link. A release mechanism is provided to enable the lock link to be made in the event of the motor and gearbox unit jamming.

22 Claims, 11 Drawing Sheets

(56) References Cited

U.S. PATENT DOCUMENTS

| | | | |
|---|---|---|---|
| 5,092,539 A | 3/1992 | Caero | |
| 5,110,068 A * | 5/1992 | Grande | B64C 25/34 |
| | | | 244/100 R |
| 5,269,481 A * | 12/1993 | Derrien | B64C 25/18 |
| | | | 244/102 A |
| 5,429,323 A * | 7/1995 | Derrien | B64C 25/14 |
| | | | 244/102 R |
| 7,731,124 B2 * | 6/2010 | Griffin | B64C 25/34 |
| | | | 244/100 R |
| 8,499,653 B1 | 8/2013 | Sheahan | |
| 8,602,352 B2 * | 12/2013 | Keller | B64C 25/14 |
| | | | 244/100 R |
| 2004/0103742 A1 | 6/2004 | Tesar | |
| 2005/0269887 A1 | 12/2005 | Blanding | |
| 2009/0108129 A1 | 4/2009 | Flatt | |
| 2009/0250552 A1 * | 10/2009 | Kearns | B64C 25/24 |
| | | | 244/102 A |
| 2009/0289145 A1 | 11/2009 | Behar | |
| 2009/0314884 A1 | 12/2009 | Elliott | |
| 2010/0012779 A1 * | 1/2010 | Collins | B64C 25/12 |
| | | | 244/102 R |
| 2010/0116930 A1 | 5/2010 | Griffin | |
| 2010/0282901 A1 * | 11/2010 | Mason | B64C 25/18 |
| | | | 244/102 R |
| 2011/0147518 A1 | 6/2011 | Nannoni | |
| 2011/0163202 A1 * | 7/2011 | Martinez | B64C 25/10 |
| | | | 244/102 SL |
| 2013/0105624 A1 * | 5/2013 | Dubois | B64C 25/24 |
| | | | 244/102 R |
| 2013/0119197 A1 * | 5/2013 | Ducos | B64C 25/26 |
| | | | 244/102 R |

FOREIGN PATENT DOCUMENTS

| | | |
|---|---|---|
| EP | 2107273 | 10/2009 |
| EP | 2130765 | 12/2009 |
| WO | 2011144629 | 11/2011 |

OTHER PUBLICATIONS

Extended European Search Report for European Application No. 14193083.4, dated Apr. 29, 2015, 6 ages.

* cited by examiner

AIRCRAFT LANDING GEAR ASSEMBLY

This application claims the benefit of European Application No. 14193083.4, filed Nov. 13, 2014, which is incorporated by reference herein.

BACKGROUND OF THE INVENTION

An aircraft landing gear assembly is generally movable between a deployed condition, for take-off and landing, and a stowed condition for flight.

An actuator is provided for moving the landing gear between the deployed condition and the stowed condition. This actuator is known in the art as a retraction actuator, and more than one can be provided. A retraction actuator may have one end coupled to the airframe and another end coupled to the main strut such that extension and retraction of the actuator results in movement of the main strut between deployed and stowed conditions.

A brace or stay is generally provided to support the orientation of the main fitting when the landing gear is in the deployed condition. A stay generally includes a two bar linkage that can be unfolded to assume a generally aligned, over centre condition in which the stay is locked to inhibit movement of the main fitting. When the stay is broken, it no longer reacts movement of the main fitting and the main fitting can be moved by the retraction actuator to the stowed condition. Some main landing gear assemblies include a pair of stays coupled to a common main fitting.

A lock link is generally provided in conjunction with each stay to maintain the stay in the locked condition. A lock link generally includes a two bar linkage that can be unfolded to assume a locked over centre condition to inhibit movement of the stay. The lock link must be broken to enable the stay to be folded, thereby permitting the main fitting to be moved by the retraction actuator towards the stowed condition.

It is common for a landing gear assembly to be arranged to move towards the deployed condition in the event of a failure of the retraction actuator. Initially, the landing gear assembly will move by way of gravity, and in doing so the stay is forced to move towards the locked condition. One or more down lock springs can be provided, which are arranged to assist in moving the landing gear assembly to the deployed condition and locking it in that state by making the lock link. Down lock springs also inhibit the lock link accidentally being unlocked and consequently it takes a large force to overcome the down lock springs when breaking the alignment of the lock link.

It is therefore known to provide a hydraulic actuator to move the lock link between the locked over centre condition and the unlocked broken condition.

In order to simplify the management and power sources for the various actuators found on an aircraft, the present inventors have sought to replace hydraulic actuators with electric or electromechanical actuators.

However, a problem exists in that failure of an electromechanical actuator generally results in the actuator locking, which could inhibit the landing gear assembly assuming the deployed condition in the event of failure of the electromechanical actuator.

SUMMARY OF THE INVENTION

In accordance with a first aspect of the present invention there is provided an aircraft landing gear assembly comprising:

a lock link comprising a first link pivotally coupled to a second link, the lock link being movable between a locked, generally aligned condition and an unlocked broken condition, a first one of the links including a lock link engagement formation that defines a swept volume as the lock link moves between the locked condition and the unlocked broken condition;

an electromechanical rotary unlock actuator comprising:
a motor unit arranged to rotate a shaft;
a crank arm mounted on the shaft to rotate therewith; and
an elongate pawl, which includes a pawl engagement formation, the pawl being movably coupled to the crank arm and biased to move relative to the crank arm such that rotation of the shaft in a first direction moves the pawl engagement formation into the swept volume of the lock link engagement formation for engagement therewith to change the lock link from the locked condition to the unlocked condition, and rotation of the shaft in the opposite direction moves the pawl engagement formation out of the swept volume of the lock link engagement formation to permit the lock link to assume the locked condition; and a release mechanism operable to permit the lock link to assume the locked condition in the event of a motor jam which inhibits rotation of the shaft in the second direction, wherein the release mechanism comprises an auxiliary actuator arranged to move the engagement formation relative to the crank arm, the release mechanism being arranged such that the pawl and actuator are independently movable with respect to one another.

The pawl engagement formation is configured such that it can break the lock link through contact with the lock link engagement formation; for example, the pawl engagement formation can define a normal or cupped surface with respect to the point of contact with the lock link engagement formation. However, if the motor fails while the pawl is in a deployed condition, the pawl engagement formation could inhibit the lock link assuming the locked condition. Thus, the release mechanism according to the first aspect includes an auxiliary actuator arranged to move the pawl engagement formation such that the engagement formation does not inhibit the lock link making. In some embodiments the pawl engagement formation can be completely withdrawn from the swept volume. However, in some embodiments it can suffice to move the pawl engagement formation from a location within the swept volume that inhibits the lock link making to a location within the swept volume that permits the lock link engagement formation to move the pawl relative to the crank arm as the lock link assumes the locked condition. The release mechanism is arranged such that the pawl and actuator are independently movable with respect to one another, meaning that normal operation of the pawl does not require passive movement of the actuator.

The auxiliary actuator can be arranged to move the engagement formation out of the swept volume by moving the pawl relative to the crank arm. Thus, the actuator can apply a force sufficient to overcome the biasing force between the pawl and crank arm, which can be provided by a spring. The actuator can include a rod or arm having a free end that is arranged to contact the pawl to move the pawl relative to the crank arm.

The actuator can comprise a motor arranged to move an elongate arm including the free end for contact with the pawl. In other embodiments the axillary actuator can take any suitable form; for example, an electromechanical or pneumatic actuator, mechanical latch or any other suitable mechanism or power source that can be used for pulling down the pawl in the event of a motor jam.

The free end of the arm can comprise a roller.

The pawl and crank arm can be pivotally coupled to one another via a pivot pin.

The engagement formation can be movably mounted relative to the body of the pawl to move between a deployed condition and retracted condition, the auxiliary actuator being configured to move the engagement formation from the deployed condition to the retracted condition to enable the lock link to assume the locked condition. Thus, the auxiliary actuator, which can be mounted on the pawl, can move the engagement formation to a reveal a passage surface orientated such that the lock link engagement formation can move the pawl relative to the crank arm, or in some cases the auxiliary actuator can move the engagement formation out of the swept volume.

The pawl can include a sloped passage region having a contact face orientated at a different angle relative to the contact face of the pawl engagement formation. The pawl engagement formation can be mounted in parallel with the pawl such that the contact face of the pawl engagement formation is prominent relative to the contact face of the sloped passage region when the engagement formation is in the deployed condition. As such, the pawl engagement formation can cause movement and react movement of the lock link engagement formation when the pawl engagement formation is in the deployed condition. When the pawl engagement formation is moved to the retracted condition, it is no longer prominent with respect to the sloped passage region, meaning that the lock link engagement formation can move along the angled passage region of the pawl and in doing so move the pawl relative to the crank arm to force the withdrawn pawl engagement formation out of the swept volume.

The auxiliary actuator can comprise an electric motor arranged to rotate a cam surface against which a fear face of the pawl engagement formation is biased.

The lock link engagement formation can comprises a roller mounted on a projection.

The auxiliary actuator can comprise an electromechanical actuator.

In accordance with a second aspect of the present invention there is provided an aircraft landing gear assembly comprising:

a lock link comprising a first link pivotally coupled to a second link, the lock link being movable between a locked, generally aligned condition and an unlocked broken condition, a first one of the links including a lock link engagement formation that defines a swept volume as the lock link moves between the locked condition and the unlocked broken condition;

an electromechanical rotary unlock actuator comprising:
a motor unit arranged to rotate a shaft;
a crank arm mounted on the shaft to rotate therewith; and
an elongate pawl which includes a pawl engagement formation, the pawl being movably coupled to the crank arm and biased to move relative to the crank arm such that rotation of the shaft in a first direction moves the pawl engagement formation into the swept volume of the lock link engagement formation for engagement therewith to change the lock link from the locked condition to the unlocked condition, and rotation of the shaft in the opposite direction moves the pawl engagement formation out of the swept volume of the lock link engagement formation to permit the lock link to assume the locked condition; and a release mechanism operable to permit the lock link to assume the locked condition in the event of a motor jam which inhibits rotation of the shaft in the second direction, wherein the release mechanism comprises a torque transmitting interface provided between a motor side of the shaft and the pawl, the torque transmitting interface being arranged to transmit a force required to change the lock link from the locked over centre condition to the unlocked broken condition and being arranged to not transmit a reactive force equating to the lock link, in use, moving from the unlocked broken condition to the locked over centre condition.

Thus, the release mechanism according to the second aspect includes a torque transmitting interface arranged to transmit a force sufficient for the pawl to break the lock link, but arranged to yield as the lock link is made to assume the locked over centre condition against opposition provided by the pawl in the event of a motor jam.

The torque transmitting interface can comprise a slipper mechanism, such as that found in a torque wrench.

Alternatively, the torque transmitting interface can comprise splines or the like configured to shear upon application of a predetermined load.

In accordance with a third aspect of the present invention there is provided an aircraft landing gear assembly comprising:

a lock link comprising a first link pivotally coupled to a second link, the lock link being movable between a locked, generally aligned condition and an unlocked broken condition, a first one of the links including a lock link engagement formation that defines a swept volume as the lock link moves between the locked condition and the unlocked broken condition;

an electromechanical rotary unlock actuator comprising:
a motor unit arranged to rotate a shaft;
a crank arm mounted on the shaft to rotate therewith; and
an elongate pawl which includes a pawl engagement formation, the pawl being movably coupled to the crank arm and biased to move relative to the crank arm such that rotation of the shaft in a first direction moves the pawl engagement formation into the swept volume of the lock link engagement formation for engagement therewith to change the lock link from the locked condition to the unlocked condition, and rotation of the shaft in the opposite direction moves the pawl engagement formation out of the swept volume of the lock link engagement formation to permit the lock link to assume the locked condition; and a release mechanism operable to permit the lock link to assume the locked condition in the event of a motor jam which inhibits rotation of the shaft in the second direction, wherein the release mechanism includes a clutch mechanism provided between an input side of the shaft and an output side of the shaft, the clutch mechanism being arranged to enable the output side of the shaft to rotate relative to the input side of the shaft in the event of a motor/gear-box jam.

The release mechanism can comprise a free rotation torque diode arranged between the input side of the shaft and the output side of the shaft. Thus, the release mechanism can be implemented as a passive mechanism arranged so that torque applied to the output shaft is never transmitted to the input shaft.

Alternatively, the clutch can be an active device biased to a first condition in which the clutch transmits rotational force between the input and output shafts, and operable to assume a second condition in which the clutch disengages the input and output shafts so as to enable the crank arm to move in the event of a motor/gear-box jam.

In embodiments according to any aspect of the invention, the lock link engagement formation can comprise a projection, optionally with a roller disposed at its free end for contact with the pawl.

According to a further aspect of the present invention, there is provided an aircraft including one or more landing gear according to an earlier aspect.

BRIEF DESCRIPTION OF THE DRAWINGS

Embodiments of the invention will now be described with reference to the accompanying drawings, in which.

DETAILED DESCRIPTION OF EMBODIMENTS

Figure 1:
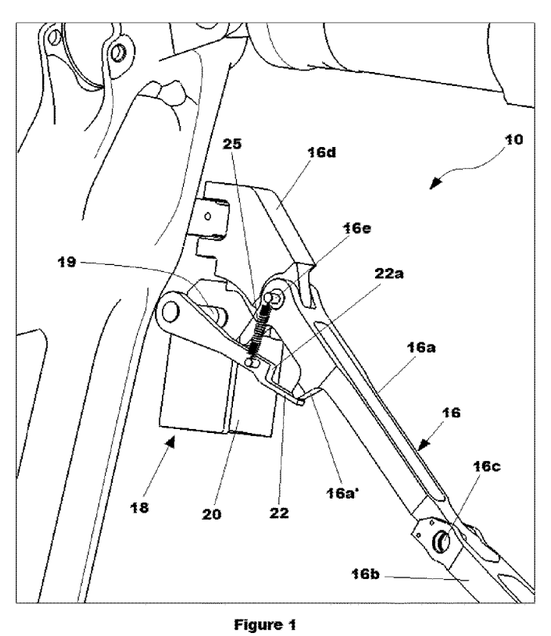
FIG. 1 is a diagram of an aircraft landing gear assembly according to an embodiment of the present invention.
Figure 2:
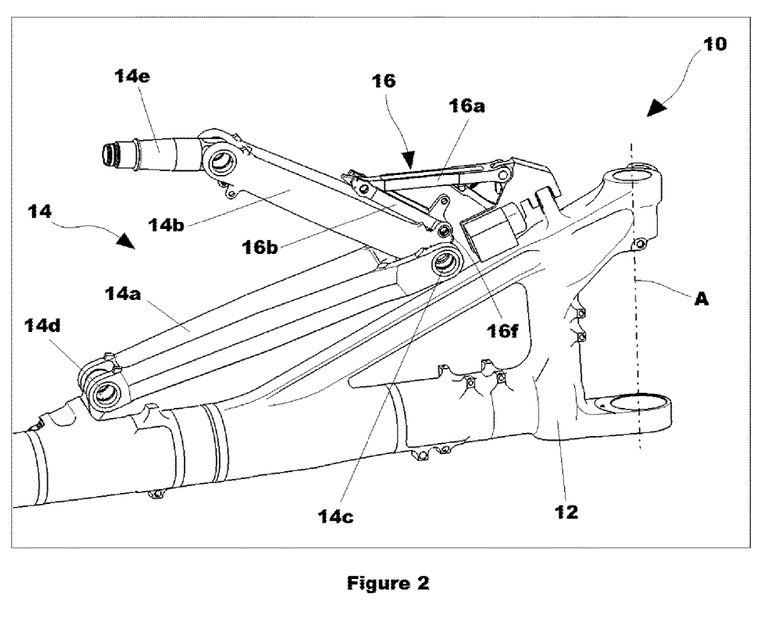
FIG. 2 is a diagram the landing gear assembly of FIG. 1 in a stowed condition.

FIGS. 1 and 2 show a landing gear assembly 10 according to an embodiment of the present invention. The aircraft landing gear assembly 10 is movable between a deployed condition, for take-off and landing, and a stowed condition for flight. A retraction actuator (not shown) is provided for moving the landing gear assembly 10 between the deployed and stowed conditions about pivot axis A.

A stay 14 is provided to support the orientation of a main fitting 12 when the landing gear assembly is in the deployed condition. The stay 14 comprises two stay elements 14a, 14b pivotally connected to one another via an elbow 14c. The first element 14a is pivotally connected to the main fitting 12 via lug 14d and the second element 14b is pivotally coupled to the airframe via pin 14e. An abutment is provided at the elbow 14c to inhibit over articulation of the stay 14 beyond a locked aligned or over centre condition which corresponds to the landing gear assembly being in the deployed condition shown in FIG. 1.

A lock link 16 is provided to maintain the stay 14 in the locked condition. The lock link 16 comprises a pair of lock link elements 16a, 16b pivotally connected to one another via pin 16c. The first element 16a is pivotally connected to the main fitting 12 via a cardan joint 16d and the second element 16b is pivotally coupled to the second stay element 14b via pin 16f. An abutment is provided at the elbow 16c to inhibit over articulation of the lock link 16 beyond a locked aligned or over centre condition which corresponds to the landing gear assembly being in the deployed condition shown in FIG. 1. One or more down lock springs (not shown) can be coupled between pin 16e and the first stay element 14a to bias the lock link 16 and stay to each remain in the locked conditions. The lock link 16 must be 'broken' to enable the stay 14 to be folded, permitting the main fitting 12 to be moved by the retraction actuator towards the stowed condition as shown in FIG. 2.

The first lock link element 16a includes a lock link engagement formation 16a' that defines a swept volume as the lock link 16 moves between the locked condition and the unlocked condition. In the illustrated embodiment the lock link engagement formation 16a' is in the form of a roller 16a' mounted at the end of a projection; however, in other embodiments the lock link engagement formation 16a' can take any suitable form, such as a smooth or polished projection or abutment.

An electromechanical rotary unlock actuator 18 is provided to break the lock link 16. The electromechanical rotary unlock actuator 18 comprises a motor and gearbox unit 20 arranged to rotate a shaft 19. An elongate pawl 22 is coupled to the shaft and arranged to be moved into contact with the roller 16a' to brake the lock link 16. The pawl 22 includes a pawl engagement formation 22a for this purpose. In the illustrated embodiment the pawl engagement formation 22a is in the form of a step or shoulder portion 22a that can catch and move the roller 16a'; however, in other embodiments the pawl engagement formation 22a can take any suitable form, such as a smooth or polished projection or abutment.

The distal end of the pawl 22 with respect to the shoulder portion 22a is pivotally attached via pivot pin 23 to an elongate arm 21 that in turn is mounted to rotate with the shaft 19. As such, the pawl 22 can be made to move with an axial component by rotation of the shaft 19 and pivotal movement of the pawl 22 relative to the arm 21. Biasing means, such as a spring 25 connected between pawl 22 and lock link 16a pivot connection to the cardan joint 16d, is provided to control pivotal movement of the pawl 22 relative to the crank arm 21. In other embodiments the pawl can be coupled to the shaft in any suitable form.

The pawl 22 is coupled to the shaft in a configuration such that rotation of the shaft 19 in a first direction moves the pawl shoulder portion 22a into the swept volume of the roller 16a' for engagement therewith to change the lock link 16 from the locked over centre condition to the unlocked broken condition.

Figure 3A:
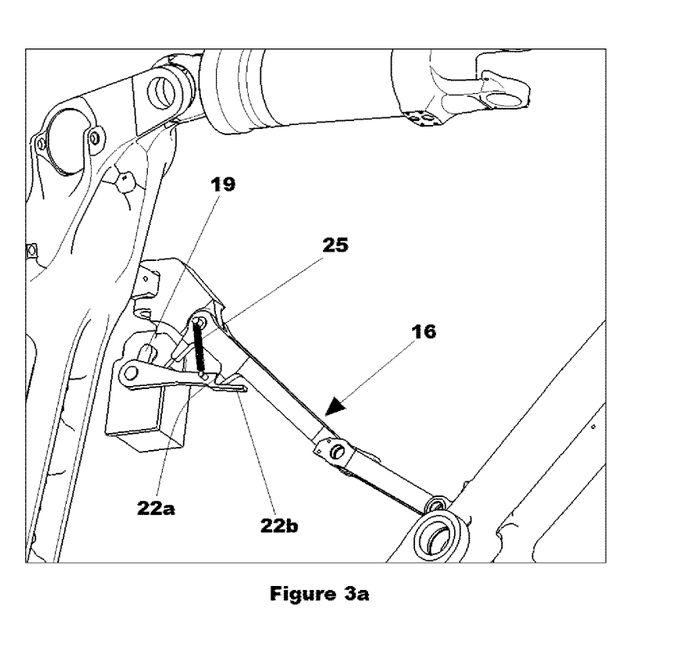
FIGS. 3a to 3c are diagrams illustrating the lock link of the landing gear assembly of FIG. 1 being broken.

Rotation of the shaft 19 in the opposite direction moves the pawl shoulder portion 22a away from and out of the swept volume of the of the roller 16a' to permit the lock link 16 to assume the locked over centre condition, as shown in FIG. 3a.

Figure 3B:
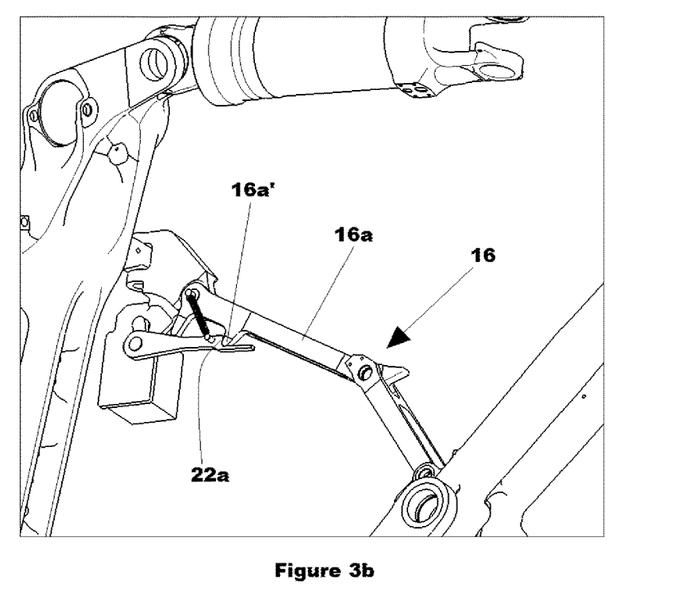
Figure 3C:
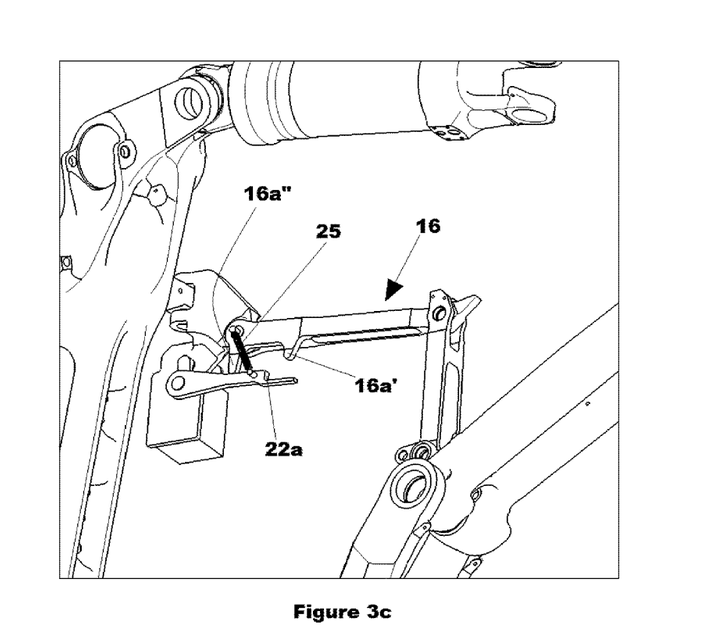

FIGS. 3a to 3c illustrate the lock link 16 being broken.

In FIG. 3a, the lock link 16 is in the locked condition. The pawl 22 is positioned such that the pawl shoulder portion 22a contact face is not in contact with the roller 16a'. The angular position of the pawl 22 with respect to the crank arm 19 is maintained by the spring 25 forcing the pawl extension 22b against the roller 16a'.

In FIG. 3b, the shaft has been rotated in the first direction, which in this embodiment is anticlockwise, by around a quarter of a revolution so as to move the pawl 22 in a generally axial manner such that the pawl shoulder portion 22a contacts and moves the roller 16a', thereby breaking the lock link 16 and the stay 14.

Thereafter, the retraction actuator can move the main fitting 12 towards the stowed condition as shown in FIG. 3c. The first lock link 16a includes a spacing arm 16a" which extends radially from lock link pivot axis 16d and defines an abutment that is spaced from the pivot axis 16d by an amount sufficient to prevent the pawl 22 being drawn under spring bias into engagement with the first lock link 16a.

Figure 4:
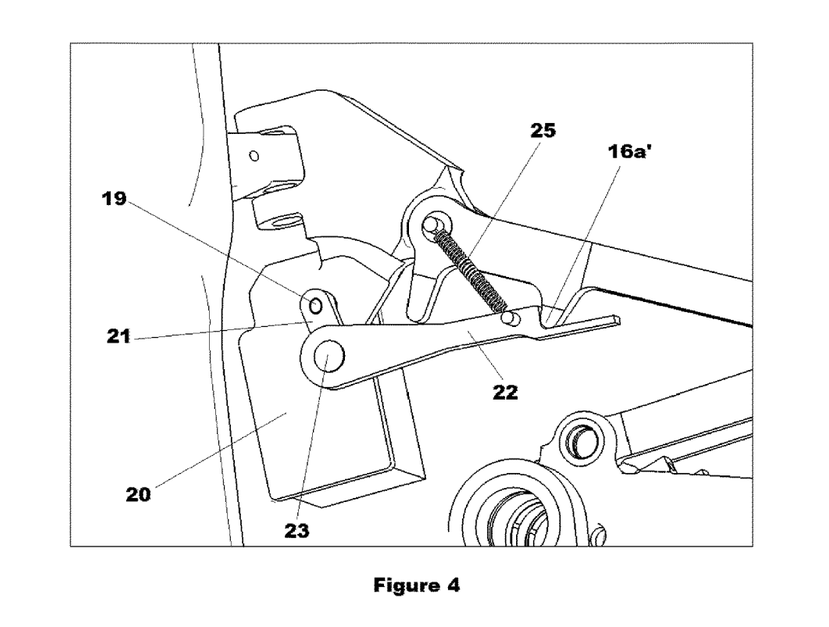
FIG. 4 is a diagram illustrating a possible jam condition for of the landing gear assembly of FIG. 1.

Referring additionally to FIG. 4, should the motor and gearbox unit 20 fail, thereby inhibiting rotation of the shaft 19, the pawl shoulder portion 22a can catch the roller 16a' inhibiting the lock link 16 assuming the locked condition. This is due to the pawl engagement formation being shaped such that pivotal movement of the lock link towards the locked condition causes the roller 16a to act on the pawl 22 in a generally axial manner, through the axis of rotation of the pivot pin 23, resulting in the pivot pin 23 reacting the lock link 16 'making' force.

As illustrated in the following figures, embodiments of the present invention include a release mechanism operable to permit the lock link to assume the locked condition in the event of a motor jam which inhibits rotation of the shaft in the second direction.

In the embodiment illustrated in FIGS. 5 to 8, the release mechanism comprises an auxiliary actuator arranged to move the pawl shoulder portion 22a relative to the crank arm (not shown). The actuator includes an electric motor 32 attached to a first side of the pawl 22, the motor being coupled to a worm gear 34. The worm gear 34 is arranged to rotate a cog 35 mounted on a shaft which extends through a bearing in the pawl 22. A cam wheel 36 is mounted on the shaft on the other side of the pawl 22 such that rotation of the motor 32 causes rotation of the cam 36.

Figure 7:
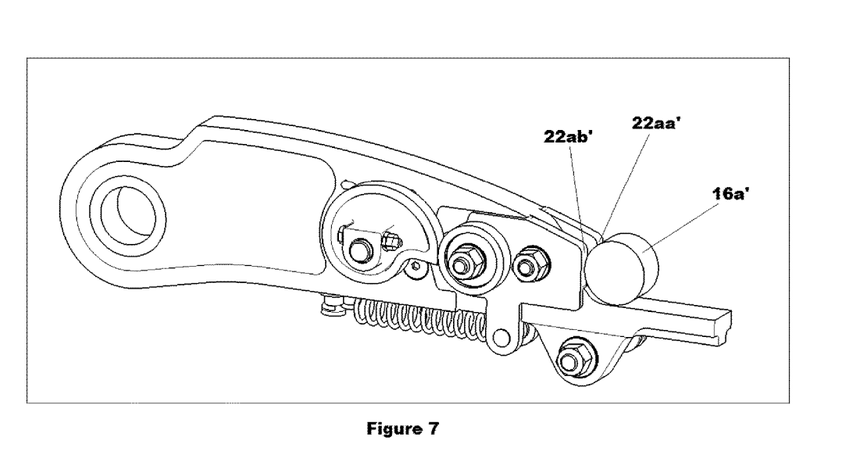
FIG. 7 is a diagram illustrating the pawl engagement formation of the release mechanism of FIG. 5 in a deployed condition, in which it can engage and push the lock link roller.
Figure 8:
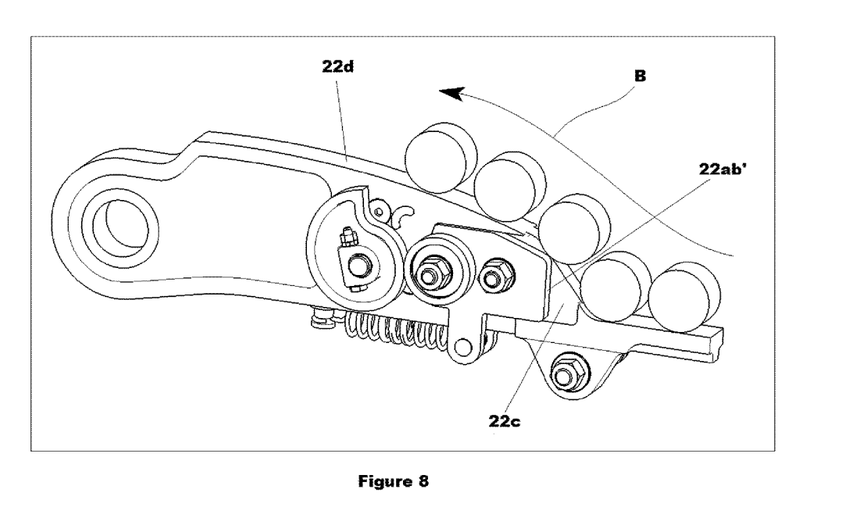
FIG. 8 is a diagram illustrating the pawl engagement formation of the release mechanism of FIG. 5 in a withdrawn condition, in which the lock link roller can move along and cause rotation of the pawl.

The pawl shoulder portion 22a comprises a pair of sliding plates 22aa, 22ab which span the body of the pawl 22 and are mounted within confirming grooves 42 in the body of the pawl 22. The pair of sliding plates 22aa, 22ab are attached to one another via a pair of pins 44a, 44b which each extends through a slot in the body of the pawl 22, the configuration of which governs the degrees of relative movement between the pawl shoulder portion 22a and the body of the pawl 22; in this example the pawl shoulder portion 22a can be linearly moved relative to the body of the pawl 22 in a generally axial manner. A spring 40 is attached at one end to the shoulder portion 22a and at another end to the pawl 22 and arranged in tension to bias the shoulder portion 22a towards the retracted condition. A roller 38 is mounted on an outer side face of one of the sliding plates 22ab and is biased into contact with the cam wheel 36 by the spring 40. As such, rotation of the cam wheel 36 causes the pawl shoulder portion 22a to move between a deployed condition, as illustrated in FIG. 7, and retracted condition, as illustrated in FIG. 8.

When the pawl shoulder portion 22a is in the deployed condition, the contact faces 22aa', 22ab' are prominent relative to a passage surface 22c of the pawl body such that they form the contact surface for engagement with the roller 16a'. As such, the pawl shoulder portion 22a can both cause and react movement of the roller 16a' when in the deployed condition.

When in the retracted condition the contact faces 22aa', 22ab' of the pawl shoulder portion 22a are withdrawn relative to the passage surface 22c of the pawl body, which is orientated such that the roller 16a' can move along the revealed smooth edge of the pawl 22 to a region 22b beyond the shoulder portion 22a, as indicated by arrow B, causing the pawl 22 to be rotated relative to the crank arm 21, thereby enabling the lock link 16 to assume the locked condition. Thus, the auxiliary actuator is arranged to move the pawl shoulder portion 22a by an amount which is sufficient to enable the lock link 16 to move the shoulder portion 22a out of the swept volume as the roller 16a' moves through the swept volume.

Figure 5:
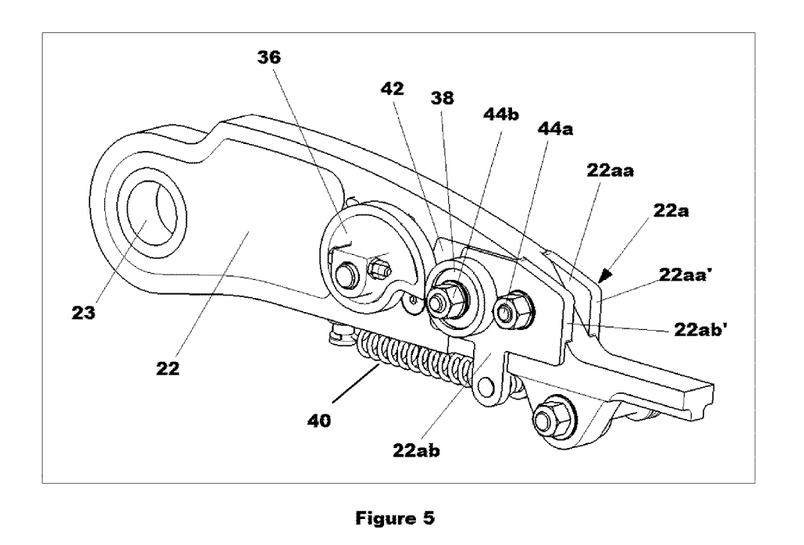
FIG. 5 is a perspective diagram from a first side of a release mechanism of the landing gear assembly of FIG. 1.
Figure 6:
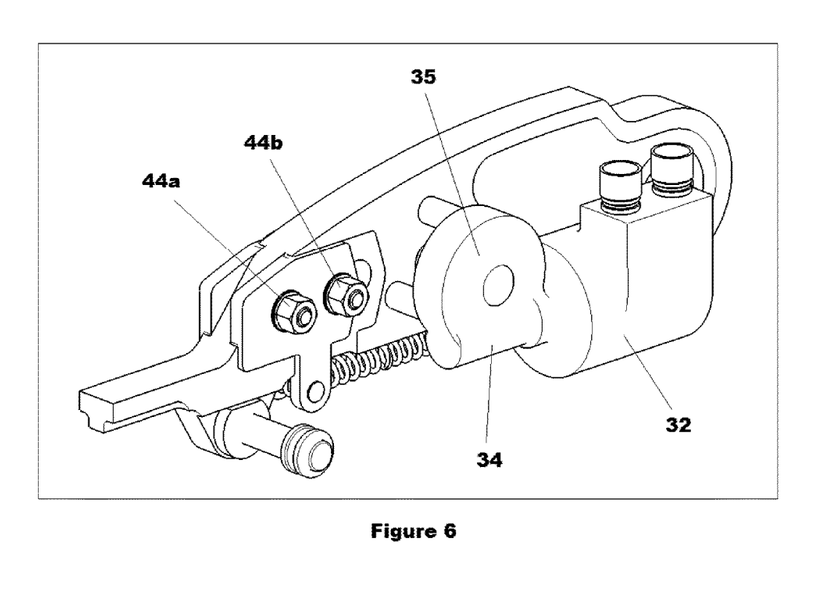
FIG. 6 is a perspective diagram from a second side of the release mechanism of FIG. 5.

The pawl 22 and actuator 32 are independently movable with respect to one another, meaning that normal operation of the pawl 22 does not require passive movement of the actuator 32.

In other embodiments the auxiliary actuator and pawl can take any suitable configuration and can in some embodiments be arranged to move the engagement formation completely out of the swept volume.

Figure 9:
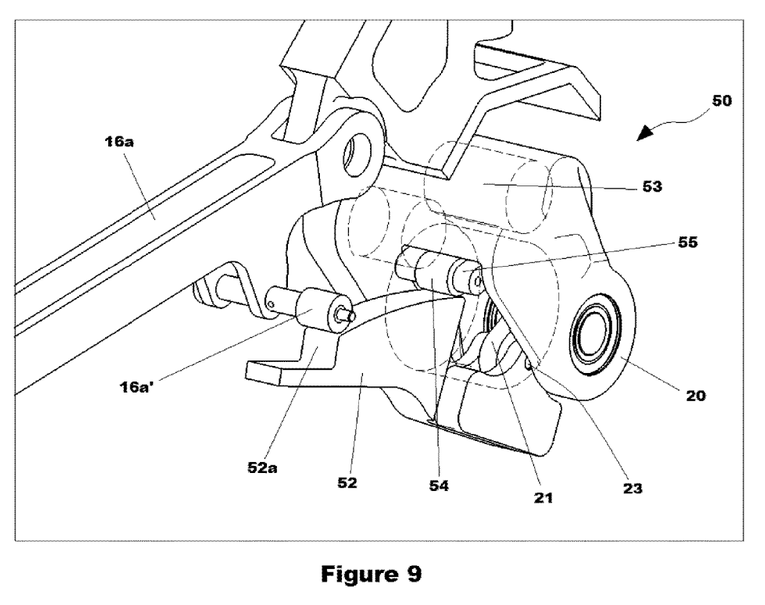
FIG. 9 is a diagram of an aircraft landing gear assembly according to a further embodiment of the present invention.

FIG. 9 shows a landing gear assembly 50 according to a further embodiment of the present invention. The landing gear assembly 50 is similar to the landing gear assembly described with reference to FIGS. 5 to 8 and for brevity the following description will focus on the differences. Parts of the landing gear assembly 50 which are functionally identical to corresponding parts of landing gear assembly 10 have been given the same reference numerals.

The release mechanism of landing gear assembly 50 comprises an auxiliary actuator 53 which includes a movable free end 54 arranged to contact the pawl 52 to move the pawl engagement formation 52a out of the swept volume by moving the pawl 52 relative to the crank arm 21. The pawl 52 and crank arm 21 can be pivotally coupled to one another via a pivot pin 23. Thus, the actuator 53 can apply a force sufficient to overcome the biasing force between the pawl 52 and crank arm 21, which can be provided by a spring (not shown).

The pawl 52 in this embodiment has a body defining an engagement formation 52a which corresponds to the shoulder portion 22a of the previous embodiment when in the deployed condition.

The auxiliary actuator 53, which can be an electric stepper motor, is mounted in a fixed relationship with respect to the primary motor and gear box unit 20. One end of an elongate arm 55 is attached to the actuator 53 shaft so as to rotate therewith. The free end 54 of the arm 55 is provided with a roller or polished surface to assist the free end in pushing the pawl 52 away from the roller 16a'.

Figure 10A:
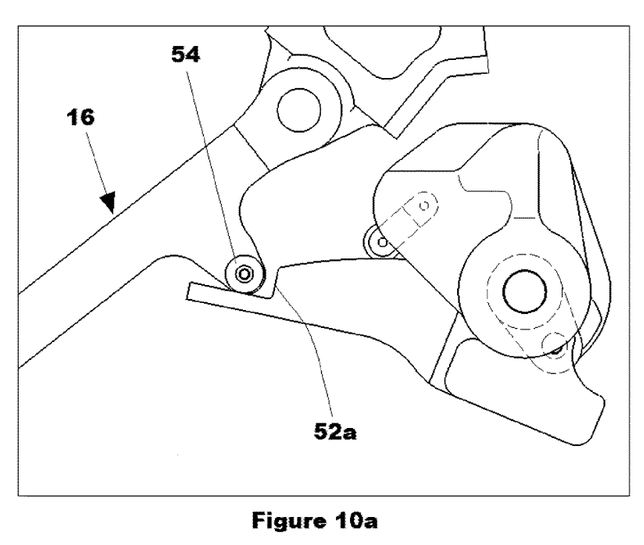
FIGS. 10a to 10c are diagrams illustrating a release mechanism of the landing gear assembly of FIG. 9 moving the shoulder region of the pawl out of the swept volume of the lock link roller.

FIG. 10a illustrates the lock link in the locked condition. The pawl engagement formation 52a is in a withdrawn condition, outside the swept volume and therefore is not in contact with the roller 16a'.

Figure 10B:
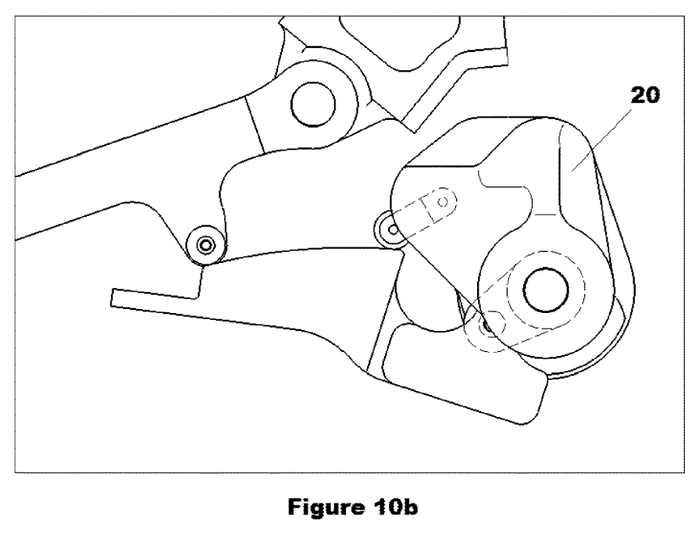

As shown in FIG. 10b, the motor and gear box unit 20 can be activated to rotate the shaft in the first direction, thereby moving the pawl engagement formation 52a into the swept volume to push the roller 16a' and break the lock link 16.

Figure 10C:
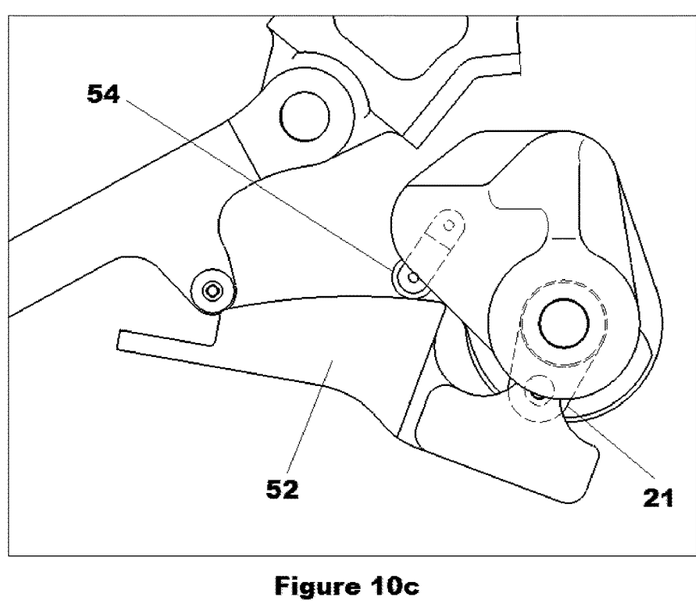

If the motor and gear box unit 20 jams, locking the position of the crank arm 21 such that the pawl engagement formation 52a is cannot be withdrawn, the auxiliary actuator 53 can be activated to move the roller 54 to push the pawl 52 away from the roller 16a' to enable the lock link 16 to assume the locked condition.

Figure 11:
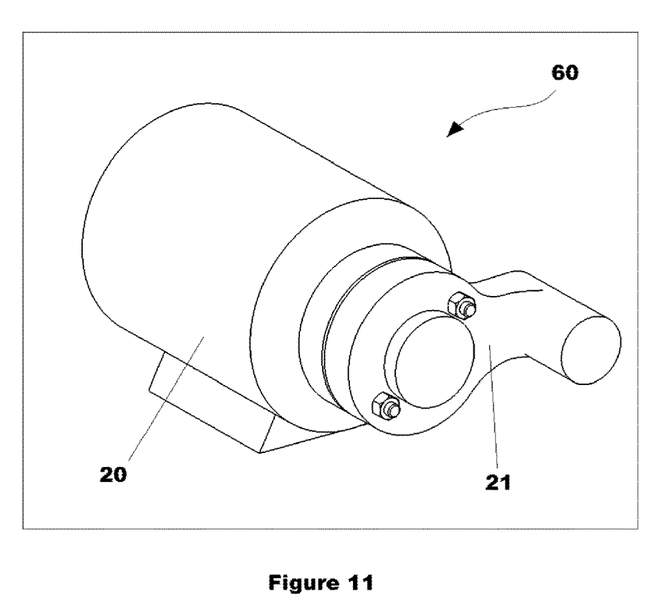
FIGS. 11 to 13 are diagrams of a release mechanism of aircraft landing gear assembly according to a further embodiment of the present invention.
Figure 12:
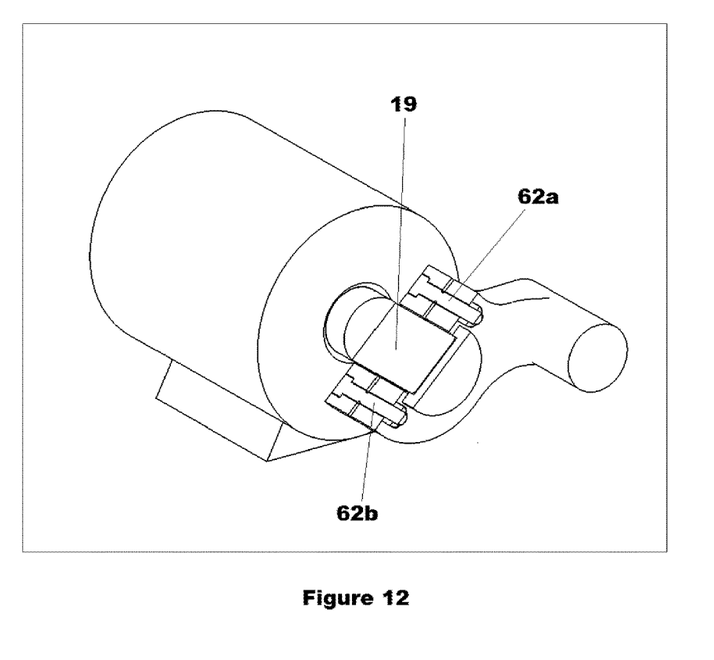
Figure 13:
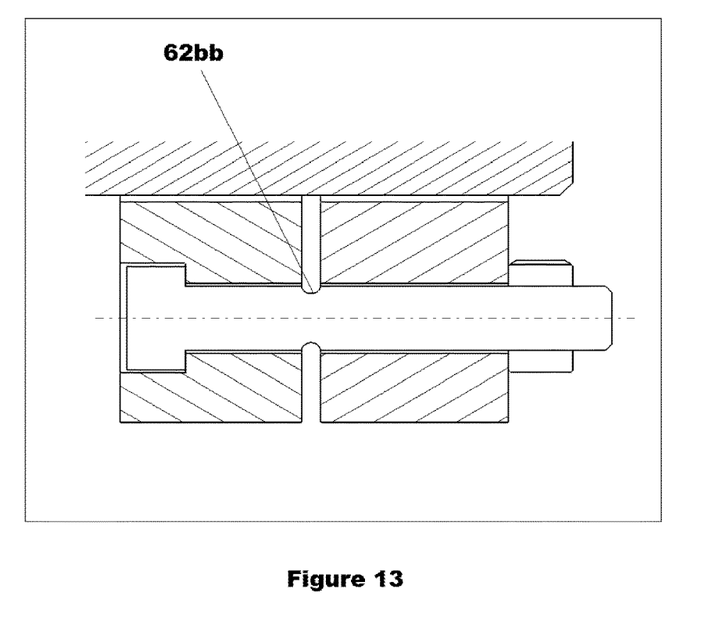

FIGS. 11 to 13 illustrate the release mechanism 60 of a further embodiment in which the release mechanism comprises a torque transmitting interface provided between a motor side of the shaft and the pawl, the torque transmitting interface being arranged to transmit a force required to change the lock link from the locked over centre condition to the unlocked broken condition and being arranged not to transmit a reactive force equating to the lock link, in use, moving from the unlocked broken condition to the locked over centre condition.

In the illustrated embodiment, the shaft 19 of the motor and gear box unit 20 is coupled to the crank arm 21 via a pair of shear pins 62a, 62b. The shear pins 62a, 62b are arranged to transmit a level of torque between the shaft 19 and crank arm 21 required to enable the release mechanism to break the lock link in normal use, but are arranged to shear when reacting a greater level of torque corresponding to the lock link 16 attempting to assume the locked condition against resistance from the pawl engagement formation in the event of motor and gear box unit 20 failing. For example, the shear pins 62a, 62b can be provided with waist regions 62bb which define regions of weakness, to govern where the pins will shear; this helps to ensure that the crank arm 21 can move relative to the shaft 19 following shearing of the pins 62a, 62b.

Figure 14:
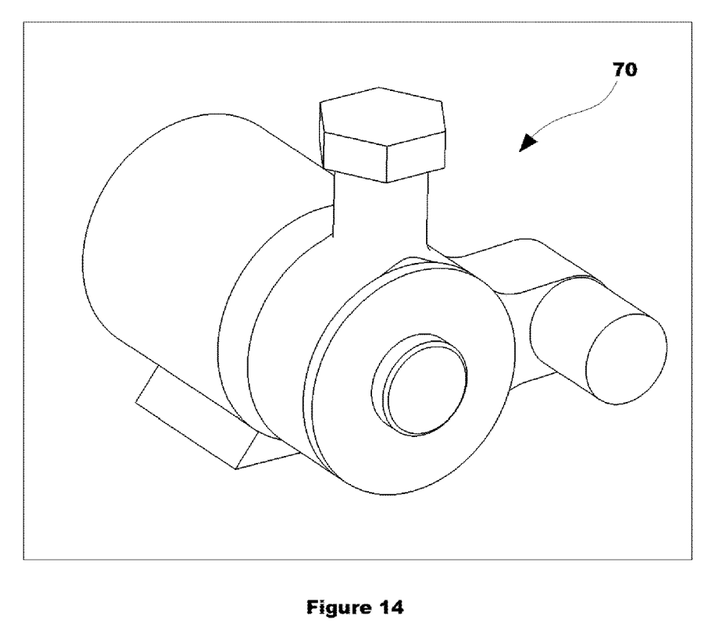
FIGS. 14 and 15 are diagrams of a release mechanism of aircraft landing gear assembly according to a further embodiment of the present invention.
Figure 15:
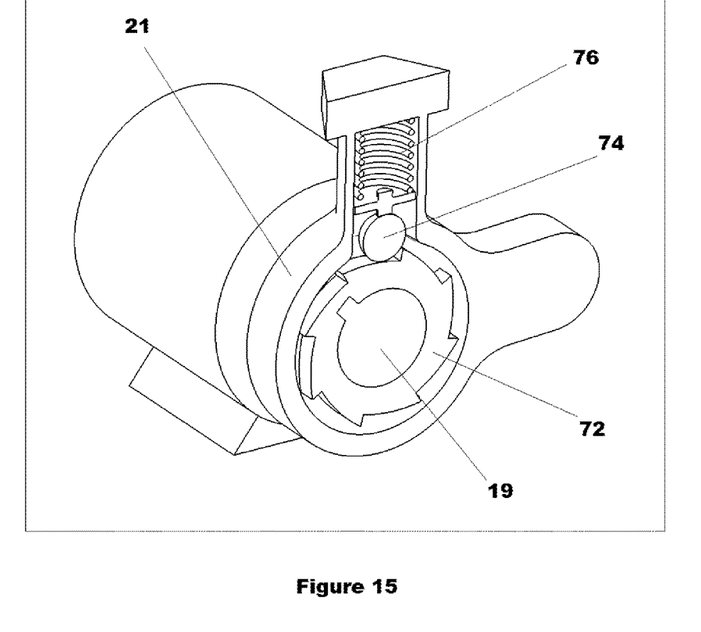

FIGS. 14 and 15 illustrate the release mechanism 70 of a further embodiment which is functionally similar to the previous embodiment in that the release mechanism comprises a torque transmitting interface. However, the release mechanism 70 of this embodiment includes a torque wrench-style interface between the shaft 19 and crank arm 21. A pawl disc 72 is mounted on the shaft 19 to rotate therewith. The crank arm 21 includes a housing including a spring 76 arranged to bias a generally spherical detent 74 into engagement with the pawl disc 72. As such, the spring force governs the level of torque that will be transmitted by the release mechanism 70.

Figure 16:
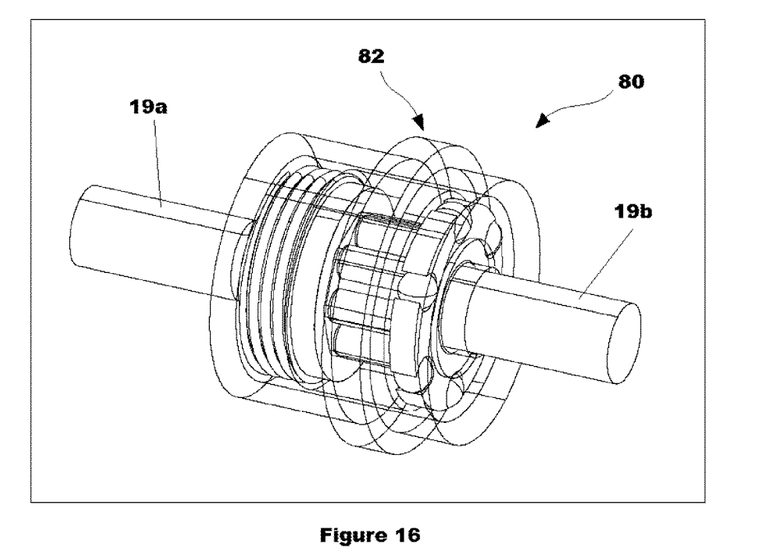
FIG. 16 is a diagram of a release mechanism of aircraft landing gear assembly according to a further embodiment of the present invention.

FIG. 16 illustrates the release mechanism 80 of a further embodiment, which includes a free rotation torque diode 82 provided between an input shaft 19a, which is arranged to be driven by the motor and gearbox unit (not shown), and an output shaft 19b, which is arranged to be attached to the crank arm (not shown). The torque diode 82 is a reverse input blocking mechanical clutch. As would be understood by the skilled person, a free rotation torque diode is a mechanism which enables the output shaft 19b to be driven by the input shaft 19a, but a rotational force applied to the output shaft 19b when the input shaft 19a is static does not cause rotation of the input shaft 19a. Various examples of suitable torque diodes would be apparent to the skilled person, such as those manufactured by NTN Corporation.

Figure 17:
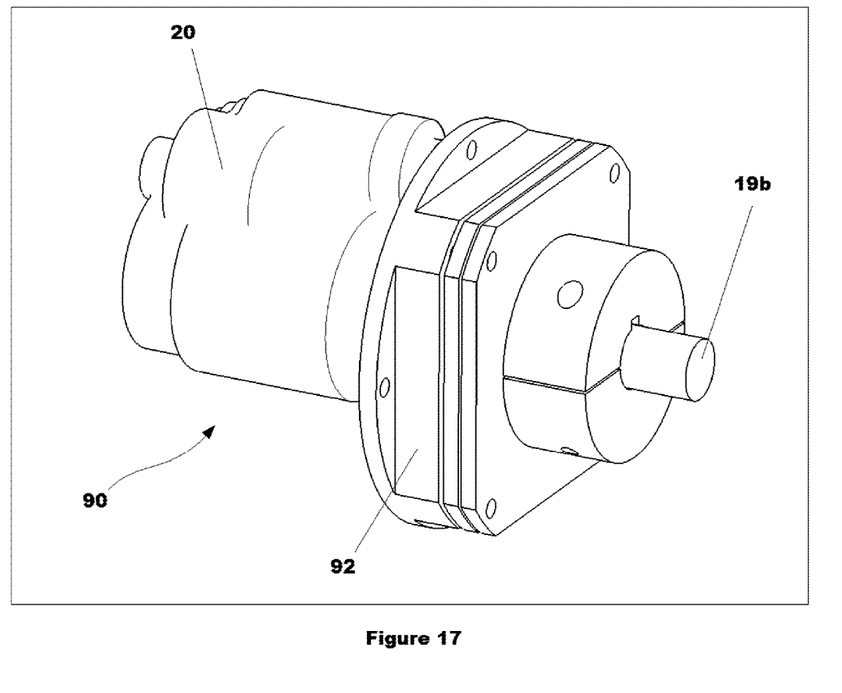
FIG. 17 is a diagram of a release mechanism of aircraft landing gear assembly according to a further embodiment of the present invention.

FIG. 17 illustrates the release mechanism 90 of a further embodiment which is functionally similar to the previous embodiment in that the release mechanism comprises a clutch mechanism provided between an input side of the shaft and an output side of the shaft, the clutch mechanism being arranged to enable the output side of the shaft to rotate relative to the input side of the shaft in the event of a motor/gear-box jam. However, this embodiment includes a clutch assembly 92 provided between the input shaft and output shaft 19b, the clutch assembly 92 being biased to a first condition in which the clutch transmits rotational force between the input and output shafts, and operable to assume a second condition in which the clutch disengages the input and output shafts so as to enable the crank arm (not shown) to rotate relative to the input shaft in the event of a motor/gear-box jam. A sensor can be provided to determine that a jam has occurred and power one or more actuators within the clutch assembly 92 to disengage the clutch.

The release mechanisms of landing gear assemblies according to embodiments of the invention provide alternative solutions to the technical problem of how to improve safety when utilising an electromechanical unlock actuator by providing a mechanism that enables the lock link to make in the event of a motor/gearbox jam.

Although the embodiments described above relate to an electromechanical rotary unlock actuator arranged to break a lock link, in other embodiments the lock link can be another form of multi bar linkage.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
   a lock link comprising a first link pivotally coupled to a second link, the lock link being movable between a locked, generally aligned condition and an unlocked broken condition, a first one of the links including a lock link engagement formation that defines a swept volume as the lock link moves between the locked condition and the unlocked broken condition;
   an electromechanical rotary unlock actuator comprising:
      a motor unit arranged to rotate a shaft;
      a crank arm mounted on the shaft to rotate therewith; and
      an elongate pawl, which includes a pawl engagement formation, the pawl being movably coupled to the crank arm such that rotation of the shaft in a first direction moves the pawl engagement formation into the swept volume of the lock link engagement formation for engagement therewith to change the lock link from the locked condition to the unlocked condition, and rotation of the shaft in the opposite direction moves the pawl engagement formation out of the swept volume of the lock link engagement formation to permit the lock link to assume the locked condition; and
   a release mechanism operable to permit the lock link to assume the locked condition in the event of a motor jam which inhibits rotation of the shaft in the second direction, wherein the release mechanism comprises an auxiliary actuator arranged to move the pawl engagement formation relative to the crank arm, the release mechanism being arranged such that the pawl and auxiliary actuator are independently movable with respect to one another.

2. The aircraft landing gear assembly according to claim 1, wherein the auxiliary actuator is configured to move the engagement formation out of the swept volume by moving the pawl relative to the crank arm.

3. The aircraft landing gear assembly according to claim 1, wherein the auxiliary actuator includes a motor arranged to move an elongate arm having a free end for moving the pawl.

4. The aircraft landing gear assembly according to claim 3, wherein the free end of the arm comprises a roller.

5. The aircraft landing gear assembly according to claim 1, wherein the engagement formation is movably mounted relative to the body of the pawl to move between a deployed condition and retracted condition, the auxiliary actuator being configured to move the engagement formation from the deployed condition to the retracted condition to enable the lock link to assume the locked condition.

6. The aircraft landing gear assembly according to claim 5, wherein the pawl includes a sloped passage region having a contact face orientated at a different angle relative to the contact face of the pawl engagement formation.

7. The aircraft landing gear assembly according to claim 6, wherein the pawl engagement formation is movably mounted in parallel with the pawl such that the contact face of the pawl engagement formation is prominent relative to the contact face of the sloped passage region when the engagement formation is in the deployed condition.

8. The aircraft landing gear assembly according to claim 5, wherein the auxiliary actuator comprises an electric motor arranged to rotate a cam surface against which a rear face of the pawl engagement formation is biased.

9. The aircraft landing gear assembly according to claim 1, wherein the pawl and crank arm are pivotally coupled to one another via a pivot pin.

10. The aircraft landing gear assembly according to claim 1, wherein the lock link engagement formation comprises a roller mounted on a projection.

11. The aircraft landing gear assembly according to claim 1, wherein the auxiliary actuator comprises an electromechanical actuator.

12. The aircraft landing gear assembly according to claim 1, wherein the lock link engagement formation comprises a projection with a roller disposed at its free end for contact with the pawl.

13. The aircraft landing gear assembly according to claim 1, wherein the auxiliary actuator has a first extension state and a second extension state, the auxiliary actuator being arranged to move the pawl engagement formation relative to the crank arm when the auxiliary actuator changes from the first extension state to the second extension state, wherein movement of the pawl engagement formation by the crank arm into and/or out of the swept volume of the lock link engagement formation does not cause the auxiliary actuator to change between the first extension state and the second extension state.

14. An aircraft landing gear assembly comprising:
a lock link comprising a first link pivotally coupled to a second link, the lock link being movable between a locked, generally aligned condition and an unlocked broken condition, a first one of the links including a lock link engagement formation that defines a swept volume as the lock link moves between the locked condition and the unlocked broken condition;
an electromechanical rotary unlock actuator comprising:
a motor unit arranged to rotate a shaft;
a crank arm mounted on the shaft to rotate therewith; and
an elongate pawl which includes a pawl engagement formation, the pawl being movably coupled to the crank arm such that rotation of the shaft in a first direction moves the pawl engagement formation into the swept volume of the lock link engagement formation for engagement therewith to change the lock link from the locked condition to the unlocked condition, and rotation of the shaft in the opposite direction moves the pawl engagement formation out of the swept volume of the lock link engagement formation to permit the lock link to assume the locked condition; and
a release mechanism operable to permit the lock link to assume the locked condition in the event of a motor jam which inhibits rotation of the shaft in the second direction, wherein the release mechanism comprises a torque transmitting interface provided between a motor side of the shaft and the pawl, the torque transmitting interface being arranged to transmit a force required to change the lock link from the locked over centre condition to the unlocked broken condition and being arranged to not transmit a reactive force equating to the lock link, in use, moving from the unlocked broken condition to the locked over centre condition.

15. The aircraft landing gear assembly according to claim 14, wherein the torque transmitting interface comprises a slipper mechanism including an input side rotationally coupled to an output side, the input side being coupled to the shaft and the output shaft being coupled to an anchor point on the landing gear assembly, the input side being provided with an input engagement formation which, upon rotation of the input side, engages with an output engagement formation associated with the output side to transmit a relatively low torque from the inputs side to the output side, wherein at least one of the engagement formations is resiliently movable against a biasing device such that application of a relatively high torque to the input side causes movement of the engagement formation such that the slipper mechanism does not transmit the relatively high torque from the input side to the output side.

16. The aircraft landing gear assembly according to claim 14, wherein the torque transmitting interface comprises shear pins configured to shear upon application of a predetermined load.

17. The aircraft landing gear assembly according to claim 14, wherein the lock link engagement formation comprises a projection with a roller disposed at its free end for contact with the pawl.

18. The aircraft landing gear assembly according to claim 14, wherein the torque transmitting interface selectively transfers torque between the motor unit and the pawl.

19. An aircraft landing gear assembly comprising:
a lock link comprising a first link pivotally coupled to a second link, the lock link being movable between a locked, generally aligned condition and an unlocked broken condition, a first one of the links including a lock link engagement formation that defines a swept volume as the lock link moves between the locked condition and the unlocked broken condition;
an electromechanical rotary unlock actuator comprising:
a motor unit arranged to rotate a shaft;
a crank arm mounted on the shaft to rotate therewith; and
an elongate pawl which includes a pawl engagement formation, the pawl being movably coupled to the crank arm such that rotation of the shaft in a first direction moves the pawl engagement formation into the swept volume of the lock link engagement formation for engagement therewith to change the lock link from the locked condition to the unlocked condition, and rotation of the shaft in the opposite direction moves the pawl engagement formation out of the swept volume of the lock link engagement formation to permit the lock link to assume the locked condition; and a release mechanism operable to permit the lock link to assume the locked condition in the event of a motor jam which inhibits rotation of the shaft in the second direction, wherein the release mechanism includes a clutch mechanism provided between an input side of the shaft and an output side of the shaft, the clutch mechanism being arranged to enable the output side of the shaft to rotate relative to the input side of the shaft in the event of a motor/gear-box jam.

20. The aircraft landing gear assembly according to claim 19, wherein the clutch mechanism comprises a free rotation torque diode.

21. The aircraft landing gear assembly according to claim 19, wherein the clutch mechanism comprises an active device biased to a first condition in which the clutch transmits rotational force between the input and output shafts, and operable to assume a second condition in which the clutch disengages the input and output shafts so as to enable the crank arm to move in the event of a motor/gear-box jam.

22. The aircraft landing gear assembly according to claim 19, wherein the lock link engagement formation comprises a projection with a roller disposed at its free end for contact with the pawl.

* * * * *